(12) United States Patent
Caffell et al.

(10) Patent No.: US 9,050,610 B2
(45) Date of Patent: Jun. 9, 2015

(54) HYDROCLONE WITH INLET FLOW SHIELD

(71) Applicant: Dow Global Technologies LLC, Midland, MI (US)

(72) Inventors: George D. Caffell, Moss Beach, CA (US); Gene A. McKay, Woodside, CA (US); Steven E. O'Reilly, Menlo Park, CA (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 14/390,461

(22) PCT Filed: May 7, 2013

(86) PCT No.: PCT/US2013/039798
§ 371 (c)(1),
(2) Date: Oct. 3, 2014

(87) PCT Pub. No.: WO2013/173115
PCT Pub. Date: Nov. 21, 2013

(65) Prior Publication Data
US 2015/0108057 A1    Apr. 23, 2015

Related U.S. Application Data

(60) Provisional application No. 61/648,096, filed on May 17, 2012.

(51) Int. Cl.
| | | |
|---|---|---|
| *B01D 21/26* | (2006.01) | |
| *B04C 9/00* | (2006.01) | |
| *B04C 5/22* | (2006.01) | |
| *B01D 36/04* | (2006.01) | |
| *B01D 21/00* | (2006.01) | |
| *B01D 36/00* | (2006.01) | |
| *B04C 5/181* | (2006.01) | |
| *B01D 29/90* | (2006.01) | |
| *B04C 5/103* | (2006.01) | |
| *B01D 29/64* | (2006.01) | |
| *B04C 5/14* | (2006.01) | |

(52) U.S. Cl.
CPC .............. *B04C 9/00* (2013.01); *B04C 2009/004* (2013.01); *B04C 5/22* (2013.01); *B01D 36/045* (2013.01); *B01D 21/0012* (2013.01); *B01D 36/00* (2013.01); *B04C 5/181* (2013.01); *B01D 29/908* (2013.01); *B04C 5/103* (2013.01); *B01D 29/6415* (2013.01); *B01D 2201/583* (2013.01); *B04C 5/14* (2013.01); *B01D 21/267* (2013.01)

(58) Field of Classification Search
CPC .............. B04C 5/02; B04C 5/04; B04C 5/06; B04C 5/08; B04C 5/103; B04C 5/12; B04C 5/13; B04C 5/14; B04C 5/181; B04C 5/22; B04C 5/23; B04C 9/00; B04C 11/00; B04C 2009/004; B04C 2009/007; C02F 2301/026; C02F 1/38; B01D 17/0217; B01D 19/0094; B01D 21/26; B01D 21/262; B01D 21/265; B01D 21/267; B01D 29/64; B01D 29/6407; B01D 29/6415; B01D 29/6469; B01D 29/6476; B01D 29/90; B01D 29/908; B01D 36/00; B01D 36/045; B01D 29/115; B01D 29/62; B01D 2201/02; B01D 2201/08; B01D 2201/583; B01D 2201/0415; B01D 21/2488; B01D 21/30; B01D 21/0003; B01D 21/2411; B01D 21/0012; B01D 21/0006
See application file for complete search history.

(56) References Cited

U.S. PATENT DOCUMENTS

| | | |
|---|---|---|
| 431,448 A | 7/1890 | Dixon |
| 1,107,485 A | 8/1914 | Bowser |
| 1,919,653 A | 7/1933 | Hill |
| 2,706,045 A | 4/1955 | Large |
| 2,788,087 A | 4/1957 | Lenehan |
| 2,917,173 A | 12/1959 | Rakowsky |
| 3,061,098 A | 10/1962 | Brezinski |
| 3,219,186 A | 11/1965 | Polhemus et al. |
| 3,285,422 A | 11/1966 | Wiley |
| 3,529,544 A | 9/1970 | Inoue |
| 3,529,724 A | 9/1970 | Maciula et al. |

| | | |
|---|---|---|
| 3,822,533 A | 7/1974 | Oranje |
| 3,893,914 A | 7/1975 | Bobo |
| 3,947,364 A | 3/1976 | Laval, Jr. |
| 4,062,766 A | 12/1977 | Duesling |
| 4,120,783 A | 10/1978 | Baummer |
| 4,146,468 A | 3/1979 | Wilson |
| 4,159,073 A | 6/1979 | Liller |
| 4,178,258 A | 12/1979 | Papay et al. |
| 4,216,095 A | 8/1980 | Ruff |
| 4,298,465 A | 11/1981 | Druffel |
| 4,414,112 A | 11/1983 | Simpson et al. |
| 4,575,406 A | 3/1986 | Slafer |
| 4,596,586 A | 6/1986 | Davies et al. |
| 4,608,169 A | 8/1986 | Arvanitakis |
| 4,651,540 A | 3/1987 | Morse |
| 4,662,909 A | 5/1987 | Durr |
| 4,698,156 A | 10/1987 | Bumpers |
| 4,865,751 A | 9/1989 | Smisson |
| 4,931,180 A | 6/1990 | Darchambeau |
| 5,104,520 A | 4/1992 | Maronde et al. |
| 5,116,516 A | 5/1992 | Smisson |
| 5,188,238 A | 2/1993 | Smisson et al. |
| 5,227,061 A | 7/1993 | Bedsole |
| 5,277,705 A | 1/1994 | Anderson et al. |
| 5,407,584 A | 4/1995 | Broussard, Sr. |
| 5,466,384 A | 11/1995 | Prevost et al. |
| 5,478,484 A | 12/1995 | Michaluk |
| 5,593,043 A | 1/1997 | Ozmerih |
| 5,879,545 A | 3/1999 | Antoun |
| 5,972,215 A | 10/1999 | Kammel |
| 6,110,242 A | 8/2000 | Young |
| 6,117,340 A | 9/2000 | Carstens |
| 6,210,457 B1 | 4/2001 | Siemers |
| 6,238,579 B1 | 5/2001 | Paxton et al. |
| 6,251,296 B1 | 6/2001 | Conrad et al. |
| 6,511,599 B2 | 1/2003 | Jaroszczyk et al. |
| 6,531,066 B1 | 3/2003 | Saunders et al. |
| 6,613,231 B1 | 9/2003 | Jitariouk |
| 6,790,346 B2 | 9/2004 | Caleffi |
| 6,896,720 B1 | 5/2005 | Arnold et al. |
| 7,166,230 B2 | 1/2007 | Nilsen et al. |
| 7,316,067 B2 | 1/2008 | Blakey |
| 7,351,269 B2 | 4/2008 | Yau |
| 7,632,416 B2 | 12/2009 | Levitt |
| 7,651,000 B2 | 1/2010 | Knol |
| 7,785,479 B1 | 8/2010 | Hosford |
| 7,854,779 B2 | 12/2010 | Oh |
| 7,896,169 B2 | 3/2011 | Levitt et al. |
| 7,998,251 B2 | 8/2011 | Pondelick et al. |
| 8,201,697 B2 | 6/2012 | Levitt et al. |
| 8,663,472 B1 | 3/2014 | Mallard et al. |
| 8,701,896 B2 | 4/2014 | Levitt et al. |
| 2003/0029790 A1 | 2/2003 | Templeton |
| 2003/0221996 A1 | 12/2003 | Svoronos et al. |
| 2004/0211734 A1 | 10/2004 | Moya |
| 2005/0109684 A1 | 5/2005 | DiBella et al. |
| 2007/0039900 A1 | 2/2007 | Levitt |
| 2007/0075001 A1 | 4/2007 | Knol |
| 2007/0187328 A1 | 8/2007 | Gordon |
| 2010/0044309 A1 | 2/2010 | Lee |
| 2010/0083832 A1 | 4/2010 | Pondelick et al. |
| 2010/0096310 A1 | 4/2010 | Yoshida |
| 2011/0120959 A1 | 5/2011 | Levitt et al. |
| 2011/0160087 A1 | 6/2011 | Zhao et al. |
| 2011/0220586 A1 | 9/2011 | Levitt |
| 2012/0010063 A1 | 1/2012 | Levitt et al. |
| 2012/0145609 A1 | 6/2012 | Caffell et al. |
| 2013/0126421 A1 | 5/2013 | Levitt et al. |

FOREIGN PATENT DOCUMENTS

| | | |
|---|---|---|
| DE | 4420760 | 5/1995 |
| DE | 19914674 | 12/2000 |
| DE | 10001737 | 10/2001 |
| DE | 102005027509 | 12/2006 |
| EP | 0375671 | 6/1990 |
| EP | 0475252 | 3/1992 |
| EP | 0380817 | 1/1993 |
| EP | 0566792 | 10/1993 |
| EP | 2082793 | 7/2009 |
| FR | 2791904 | 10/2000 |
| GB | 2007118 | 5/1979 |
| GB | 2309182 | 7/1997 |
| GB | 2423264 | 8/2006 |
| KR | 2004105165 | 12/2004 |
| KR | 899416 | 5/2009 |
| WO | 0218056 | 3/2002 |
| WO | 03026832 | 4/2003 |
| WO | 2004064978 | 8/2004 |
| WO | 2011160087 | 12/2011 |
| WO | 2012154448 | 11/2012 |
| WO | 2013181028 | 12/2013 |
| WO | 2013181029 | 12/2013 |

OTHER PUBLICATIONS

DOW Water & Process Solutions, G. Onifer, Oct. 2010, Executive Summary: Clean Filtration Technologies, Inc Turboclone Filter, 1 page.

Clean Filtration Technologies, Inc. CFT Turboclone Demo System, 2010, 1 page.

Clean Filtration Technologies, Inc. CFT Turboclone TC-201 Technical Datasheet, 2010, 1 page.

*Primary Examiner* — David C Mellon

(74) *Attorney, Agent, or Firm* — Edward W. Black

(57) ABSTRACT

A hydroclone (10) including a tank (12) with a fluid inlet (14), a filtered fluid outlet (16), an effluent outlet (18), a process fluid outlet (20) and a chamber (24) including an inner peripheral wall (22) centered about a central axis (X). The hydroclone further includes: i) a filter assembly (26) located within the chamber (24) which has an outer membrane surface (44) symmetrically located about the central axis (X) and encloses a filtrate chamber (46) that is in fluid communication with the filtered fluid outlet (16), and ii) a cleaning assembly (50) concentrically located and rotatably engaged about the membrane surface (44). A fluid pathway (28) extends from the fluid inlet (14) and defines a vortex region (25) between the inner peripheral wall (22) of the chamber (24) and the membrane surface (44) and is adapted for receiving incoming fluid. An inlet flow shield (58) is concentrically located about the filter assembly (26) and is adapted to block at least a portion of fluid flowing into the chamber (24) from the fluid inlet (14) from impacting the membrane surface (44).

3 Claims, 5 Drawing Sheets

HYDROCLONE WITH INLET FLOW SHIELD

TECHNICAL FIELD

The invention is generally directed toward hydroclones and cyclonic separation of fluids.

BACKGROUND

Hydroclones are commonly used to separate suspended particles from liquids. In a typical embodiment, pressurized feed liquid (e.g. waste water) is introduced into a conically shaped chamber under conditions that create a vortex within the chamber. Feed liquid is introduced near the top of a conical chamber and an effluent stream is discharged near the bottom. Centrifugal forces associated with the vortex urge denser particles towards the periphery of the chamber. As a result, liquid located near the center of the vortex has a lower concentration of particles than that at the periphery. This "cleaner" liquid can then be withdrawn from a central region of the hydroclone. Examples of hydroclones are described in: U.S. Pat. No. 3,061,098, U.S. Pat. No. 3,529,544, U.S. Pat. No. 5,104,520, U.S. Pat. No. 5,407,584 and U.S. Pat. No. 5,478,484. Separation efficiency can be improved by including a filter within the chamber such that a portion of the liquid moving to the center of the chamber passes through the filter. In such embodiments, cyclonic separation is combined with cross-flow filtration. Examples of such embodiments are described in: U.S. Pat. No. 7,632,416, U.S. Pat. No. 7,896,169, US2011/0120959 and US2012/0010063. Aspects of cyclonic separation pose challenges for cross-flow filtration. For example, feed flow velocities used to create a vortex in cyclonic separations can result in accelerated wear or fouling of the membrane used in cross-flow filtration. This condition is exacerbated when utilizing feed fluids having high solids content.

SUMMARY

The invention includes multiple embodiments of hydroclones and methods for performing cyclonic separations using the same. In one embodiment, the invention includes a hydroclone (10) including a tank (12) with a fluid inlet (14), a filtered fluid outlet (16), an effluent outlet (18), a process fluid outlet (20) and a chamber (24) including an inner peripheral wall (22) centered about a central axis (X). The hydroclone further includes: i) a filter assembly (26) located within the chamber (24) and has a cylindrical outer membrane surface (44) symmetrically located about the central axis (X) and encloses a filtrate chamber (46) that is in fluid communication with the filtered fluid outlet (16), and ii) a cleaning assembly (50) concentrically located and rotatably engaged about the membrane surface (44). A fluid pathway (28) extends from the fluid inlet (14) and defines a vortex region (25) between the inner peripheral wall (22) of the chamber (24) and the membrane surface (44) and is adapted for receiving incoming fluid. An inlet flow shield (58) is concentrically located about the filter assembly (26) and is adapted to block at least a portion of fluid flowing into the chamber (24) from the fluid inlet (14) from impacting the membrane surface (44).

BRIEF DESCRIPTION OF THE DRAWINGS

Various aspects of the invention may be better understood by reference to the following description taken in conjunction with the accompanying drawings wherein like numerals have been used throughout the various views to designate like parts. The depictions are illustrative and are not intended to be to scale or otherwise limit the invention.

DETAILED DESCRIPTION

The present invention generally relates to the hydroclone filtration devices and related methods of conducting cyclonic separation. For purposes of the present description, the term "hydroclone" refers to a filtration device that at least partially relies upon centrifugal forces generated by vortex fluid flow to separate constituents from a fluid mixture. Examples include the separation of solid particles from a liquid mixture (e.g. aqueous mixtures) and separation of mixtures including liquids of differing densities (e.g. oil and water). Specific applications include the treatment of: pulp effluent generating by paper mills, process water generated by oil and gas recovery, bilge water and municipal and industrial waste water.

Figure 1A:
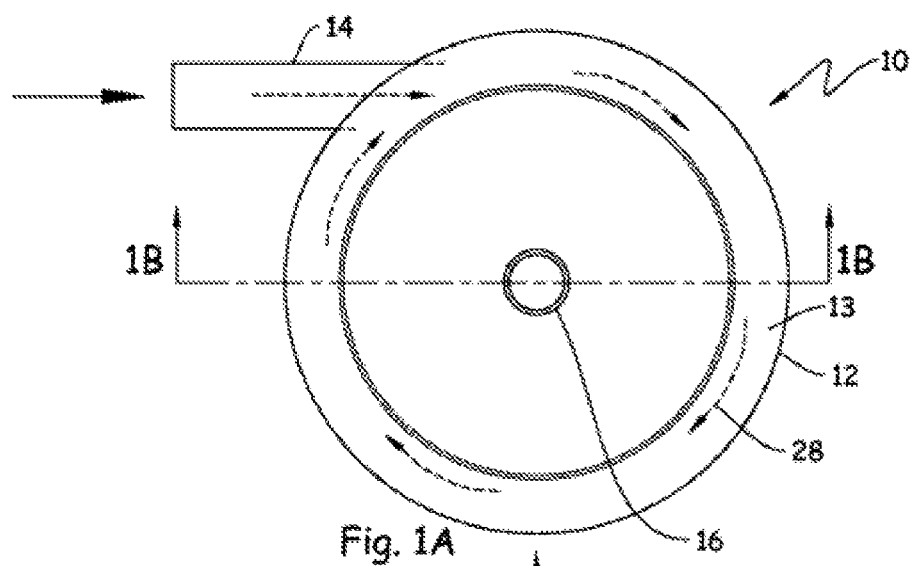
FIG. 1A is an elevational view showing one embodiment of the invention.
Figure 1B:
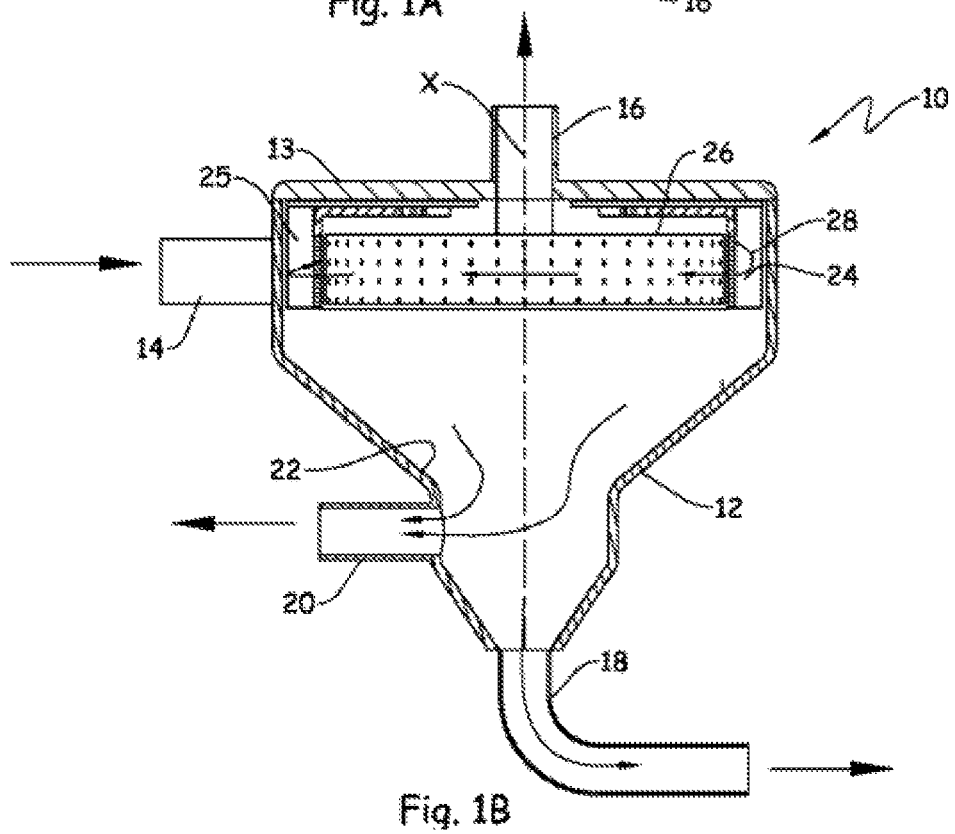
FIG. 1B is a cross-sectional view taken along lines 1B-1B of FIG. 1A.

One embodiment of the invention is illustrated in FIGS. 1A-B including a hydroclone generally shown at 10 including a tank (12) having a removable lid (13), a fluid inlet (14), a filtered fluid outlet (16), an effluent outlet (18), a process fluid outlet (20) and an inner peripheral wall (22) enclosing a chamber (24) and centered about a center axis (X). While depicted as including a single chamber, additional chambers may also be included as described in connection with FIGS. 4-5. Similarly, additional fluid inlets and outlets may also be included. While shown as having a cylindrical upper section and a frustro-conical base, the tank (12) may have other configurations including a more cylindrical shape as described in connection with FIGS. 4-5.

Figures 2A, 2B, 2C:
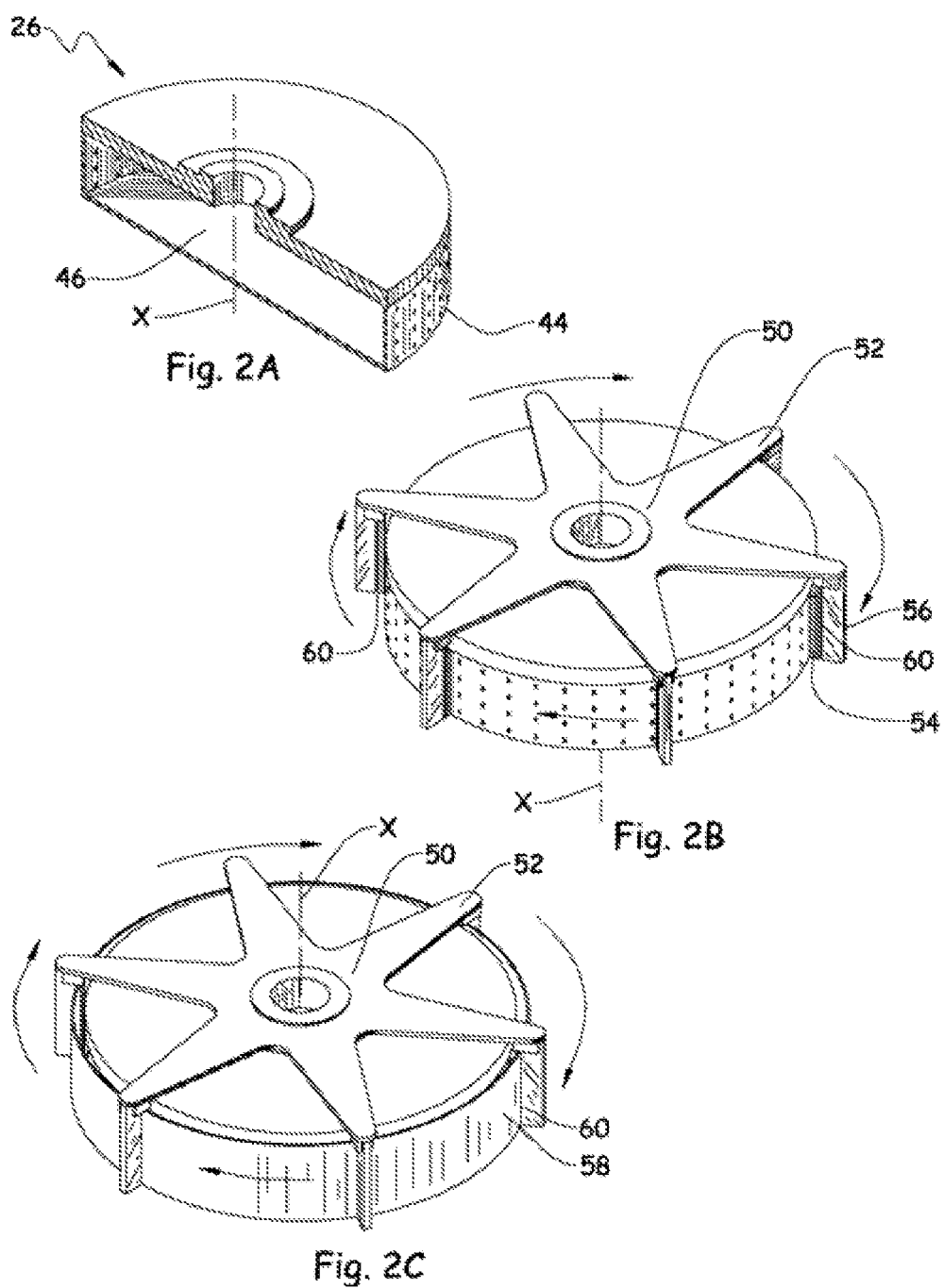
FIG. 2A is a perspective partially cut away view of a filter assembly.
FIG. 2B is a perspective view of the filter of FIG. 2A including a cleaning assembly.
FIG. 2C is a perspective view of the assembly of FIG. 2B including an inlet flow shield.

A filter assembly (26) is preferably centrally located within the chamber (24) and is evenly spaced from the inner peripheral wall (22) of the tank (12). As best shown in FIG. 2A, the assembly (26) includes a cylindrical outer membrane surface (44) symmetrically located about the central axis (X) and enclosing a filtrate chamber (46) that is in fluid communication with the filtered fluid outlet (16). While shown as being shaped as a simple cylinder, other configurations may be used including stepped and conical shaped filters. As best shown in FIG. 2A, the filter assembly (26) includes an outer membrane surface (44) which may be fabricated from a wide variety of materials including porous polymers, ceramics and metals. In one embodiment, the membrane is relatively thin, e.g. from 0.2-0.4 mm and is supported by an underlying rigid frame or porous support (not shown). A representative example is described in US2012/0010063. The pore size (e.g. 1 to 500 micron), shape (e.g. V-shape, cylindrical, slotted) and uniformity of the membrane (44) may vary depending upon application. In many preferred embodiments, the membrane (44) comprises a corrosion-resistant metal (e.g. electroformed nickel screen) including uniform sized pores having sizes from 10 to 100 microns. Representative examples of such materials are described: U.S. Pat. No. 7,632,416, U.S. Pat. No. 7,896,169, US2011/0120959, US 2011/0220586 and US2012/0010063, the entire subject matter of which is incorporated herein by reference.

As best shown in FIG. 1B, a fluid pathway (28) extends from the fluid inlet (14) and defines a vortex region (25) between the inner peripheral wall (22) of the chamber (24) and the membrane surface (44). In operation, pressurized feed fluid (e.g. preferably from 4 to 120 psi) enters the tank (12) via the fluid inlet (14) and follows along fluid pathway (28) which generates a vortex about the filter assembly (26). Centrifugal forces urge denser materials toward the inner peripheral wall (22) of the tank (12) while less dense liquid flows radially inward toward the filter assembly (26). A portion of this liquid flows through the membrane surface (44) into a filtrate chamber (46) and may subsequently exit the tank (12) as "filtrate" by way of the filtered fluid outlet (16). The remaining "non-filtrate" flows downward from the chamber (24). Fluid flow slows and denser materials (e.g. particles) preferentially settle toward the lower center of the tank and may then exit the tank by way of effluent outlet (18). The effluent outlet (18) may optionally include a valve, (e.g. one-way check value) to selectively control removal of effluent from the tank (12). The remaining liquid (hereinafter referred to as "process fluid") flows downward and may exit the tank via process fluid outlet (20). In most applications, process fluid represents a mid-grade product that may be re-used, disposed of or recycled back to the fluid inlet (14) for further treatment. "Filtrate" typically represents a high grade product that may be re-used or disposed of. "Effluent" represents a low grade product that may be further treated or disposed of. However, it should be appreciated that in some applications, effluent may represent a valuable product.

The subject hydroclone (10) may further include a cleaning assembly (50) for removing debris from the membrane surface (44) of the filter assembly (26). A representative embodiment is illustrated in FIG. 2B wherein the assembly (50) is concentrically located and rotatably engaged about the membrane surface (44) and includes one or more spokes (52) extending radially outward. A brush (54) extends downward from the end of the spoke (52) and engages (e.g. touches or comes very near to) the surface of the membrane substrate (44). While shown as a brush (54), alternative cleaning means may be included including wipers, squeegees or scrappers. From 2 to 50 brushes, and preferably from 18 to 24 brushes are used in most embodiments. As represented by curved arrows, the cleaning assembly (50) rotates about filter assembly (26) such that the brush (54) sweeps the surface of the membrane substrate (54) and removes debris, e.g. by creating turbulence near the surface or by directly contacting the surface. One or more paddles (56) may be mounted at the end of at least one spoke (52) such that fluid flowing into the vortex chamber (24) rotates the cleaning assembly (50) about the filter assembly (26). Spacing paddles (56) evenly about the filter assembly adds stability to the rotating movement of the cleaning assembly (50) and may help maintain vortex fluid flow in the vortex chamber (24). While shown as extending radially outward from the surface of the membrane substrate (44), the paddles may be slanted, (e.g. from −5° to −30° or 5° to 30° from the radial axis) to increase rotational velocity. Bearings may be used between the filter and cleaning assemblies (26, 50) to further facilitate rotation without impeding vortex fluid flow. In alternative embodiments not shown, the cleaning assembly (50) may be driven by alternative means, e.g. electronic motor, magnetic force, etc. In yet another embodiment, the filter assembly may move relative to a fixed cleaning assembly.

Figure 3:
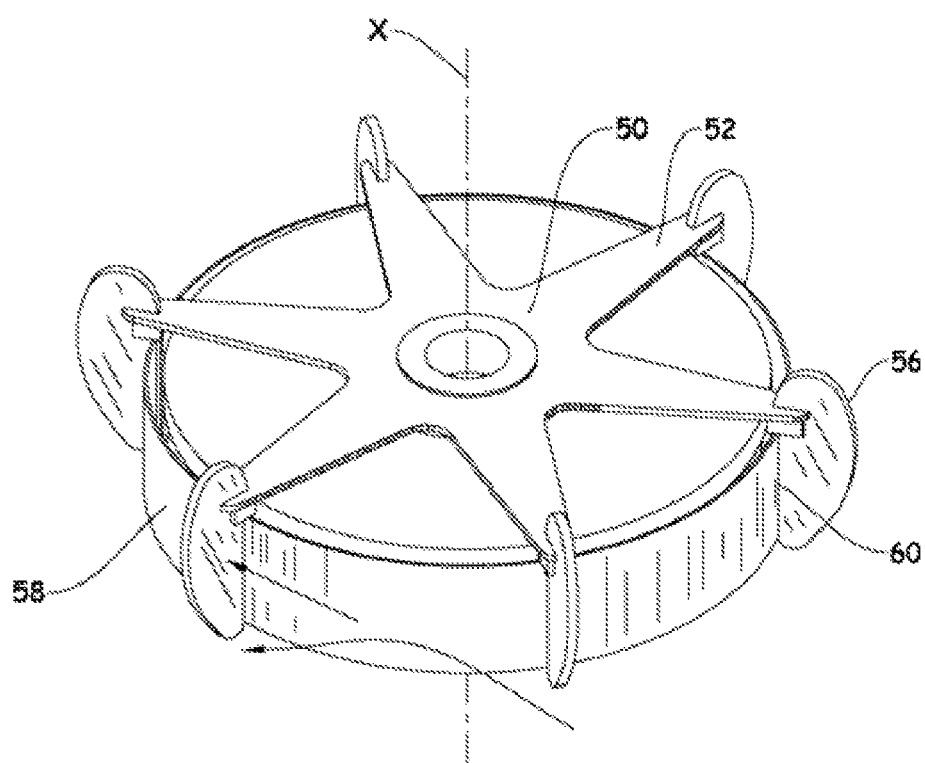
FIG. 3 is a perspective view of an alternative embodiment of the assembly of FIG. 2C.

The feed fluid inlet pressure and spacing between the outer periphery of the filter assembly (26) and the inner peripheral wall (22) of the tank (12) can be optimized to create and maintain a vortex fluid flow within the chamber (24). In order to further facilitate the creation and maintenance of vortex fluid flow, the fluid inlet (14) preferably directs incoming feed fluid on a tangential path about the vortex chamber, as indicated in FIG. 1A. Even following such a tangential path, pressurized feed fluid may directly impinge upon the membrane surface (44) of the filtration assembly (26) and lead to premature wear or fouling—particularly in connection with feed fluids having high solids content. To protect the membrane surface (44), an inlet flow shield (58) may be located between the fluid inlet (14) and the membrane surface (44), e.g. concentrically located about the filter assembly (26). Non-limiting embodiments are illustrated in FIGS. 2C and 3. As shown, the shield (58) preferably comprises a non-porous cylindrical band of material, e.g. plastic, which blocks at least a portion of fluid flowing into the chamber (24) from the fluid inlet (14) from directly impinging upon (impacting) the membrane surface (44), best shown in FIG. 3. The band may be formed from a continuous loop of material or by way of independent arcs. In a preferred embodiment, the shield (58) has a height approximating the height of the membrane surface (44) such that the shield (58) and membrane surface (44) forms concentric cylinders. In a preferred embodiment, the shield may be removably mounted to the cleaning assembly (50). By way of non-limiting example, the paddles (56) of the cleaning assembly (50) may include vertical slots (60) for receiving the shield (58), as shown in FIGS. 2B-C and 3.

Figure 4:
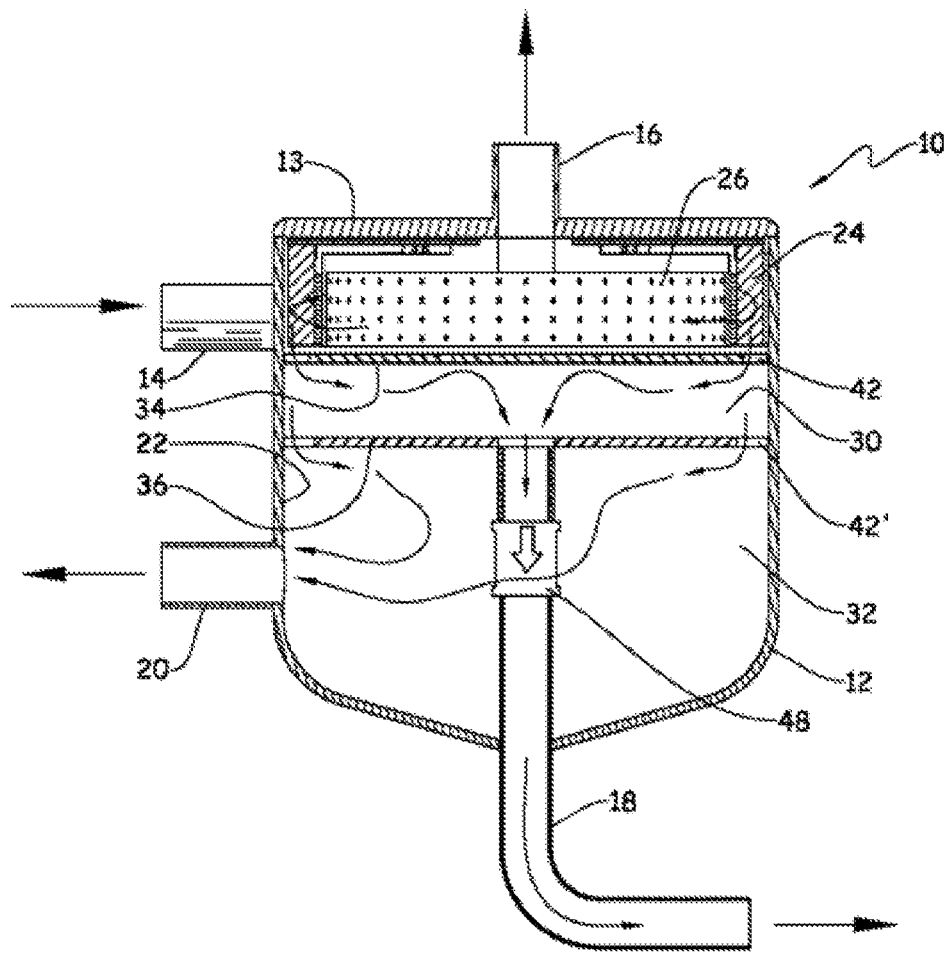
FIG. 4 is a cross-sectional view showing an alternative embodiment of the invention.
Figure 5:
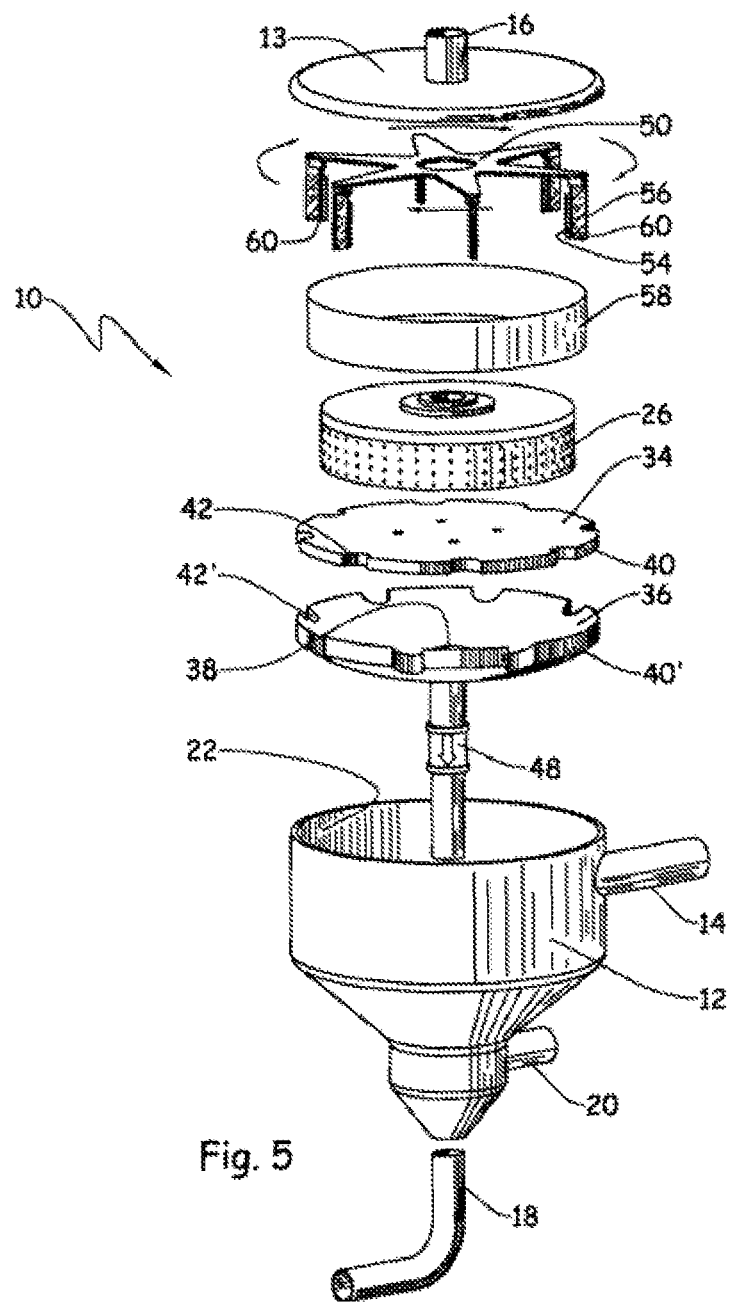
FIG. 5 is an exploded perspective view of the embodiment of FIG. 4.

An alternative embodiment of the invention is illustrated in FIGS. 4-5 wherein the tank (12) in substantially cylindrical and includes at least two and preferably three vertically aligned chambers, include a vortex chamber (24), an effluent separation chamber (30) and a process fluid chamber (32). The vortex chamber (24) is in fluid communication with fluid inlet (14). A filter assembly (26) is centrally located within the vortex chamber (24) and encloses a filtrate chamber (46). The filtrate chamber (46) is in fluid communication with the filtered fluid outlet (16). The effluent separation chamber (30) is located below and is in fluid communication with the vortex chamber (24). The effluent separation chamber (30) is adapted for receiving unfiltered fluid from the vortex chamber (24). A process fluid chamber (32) is in turn located below and is in fluid communication with the effluent separation chamber (30). The process fluid chamber (32) is adapted for receiving a process fluid from the effluent separation chamber (30) and is in fluid communication with the process fluid outlet (20) by which process fluid may exit the tank (12).

A vortex flow barrier (34) is located between the vortex and effluent separation chambers (24, 30) and directs fluid flow between the vortex and effluent separation (24, 30) chambers to locations adjacent to the inner peripheral wall (22) of the tank (12). The vortex flow barrier (34) may be designed to maintain vortex fluid flow in the effluent separation chamber (24) and disrupt vortex fluid flow as fluid flows from the vortex chamber (24) into the effluent separation chamber (30). More specifically, the vortex flow barrier (34) includes an outer periphery (40) extending to locations adjacent to or in contact with the inner peripheral wall (22) of the tank (12) and may further include a plurality of apertures (42) located near the periphery (40) and extending therethrough. In the illustrated embodiment, the apertures (42) are scalloped-shaped but alternative shapes may also be used.

An optional effluent barrier (36) is located below the effluent separation chamber (30) and is adapted to direct fluid flow from the effluent separation chamber (30) to the process fluid outlet (20). The effluent barrier (36) includes an outer periphery (40') extending to locations adjacent to or in contact with the inner peripheral wall (22) of the tank (12) and may further include a plurality of apertures (42') located near the periphery (40') and extending therethrough. In the illustrated embodiment, the apertures (42') are scalloped-shaped but alternative shapes may also be used. In a preferred embodiment, the apertures (42) of the vortex flow barrier (34) are vertically off-set from the apertures (42') of the effluent barrier (36), as shown by dotted arrows in FIG. 2. The effluent barrier (36) also includes a centrally located effluent opening (38) in fluid communication with the effluent outlet (18) by which effluent may exit the tank (12).

In operation, pressurized feed fluid (e.g. preferably from 4 to 120 psi) enters the tank (12) via the fluid inlet (14) and follows along fluid pathway (28) which generates a vortex about the filter assembly (26). Centrifugal forces urge denser materials toward the inner peripheral wall (22) of the tank (12) while less dense liquid flows radially inward toward the filter assembly (26). A portion of this liquid flows through the filter assembly (26) into a filtrate chamber (46) and may subsequently exit the tank (12) as "filtrate" by way of the filtered fluid outlet (16). The remaining "non-filtrate" flows downward from the vortex chamber (24) to the effluent separation chamber (30). The vortex flow barrier (34) directs the majority (e.g. preferably at least 75% and in some embodiments at least 90%) of such downward flow to locations along or adjacent to an inner peripheral wall (22) of the tank (12). This arrangement is believed to help maintain vortex flow within the vortex chamber (24) while disrupting the vortex flow as fluid enters the effluent separation chamber (30). Fluid flow slows in the effluent separation chamber (30) and denser materials (e.g. particles) preferentially settle toward the center of the effluent barrier (34) and enter into the effluent opening (38) and may then exit the tank by way of effluent outlet (18). The effluent outlet (18) may optionally include a valve (48) (e.g. one-way check value) to selectively control removal of effluent from the tank (12). The remaining liquid (hereinafter referred to as "process fluid") in the effluent separation chamber (30) flows downward into the process fluid chamber (32). The effluent barrier (36) directs a majority (e.g. preferably at least 75% and in some embodiments at least 90%) of fluid flow between the effluent separation vortex and process fluid chambers (34, 36) to locations along or adjacent to an inner peripheral wall (22) of the tank (12), i.e. through apertures (42').

While in one embodiment the effluent barrier (36) includes scalloped-shaped apertures (42'), alternatively shaped apertures may also be used including radial slots, angled slots and triangular openings located about the outer periphery (40'). Similarly, alternatively shaped apertures (42) may be used with respect to the vortex flow barrier (34). The shape and size of the aperture (42, 42') may be designed to control the flow of fluid downward through the chambers (24, 30, 32) of the tank (12), with flow being preferentially directed to the inner peripheral wall (22) of the tank (12). With that said, a minority (e.g. less than 50% and more preferably less than 75% and still more preferably less than 90%) of the downward flow (i.e. non-effluent fluid with respect to the effluent barrier (36)) may occur at alternative locations including the center location of one or both barriers (42, 36). In yet other non-illustrated embodiment, one or both of the vortex flow barrier (34) and effluent barrier (36) may include outer peripheries that do not contact the inner peripheral wall (22) of the tank (12) and include no apertures.

The subject hydroclones provide superior separation efficiencies as compared with previous designs. These efficiencies allow the hydroclone to be used a broader range of applications; particular in embodiments where process fluid is recycled and optionally blended with make-up feed fluid. Broadly stated, feed fluid is subjected to a synergistic combination of multiple separation processes within a single device. Specifically, feed fluid is subject to cyclonic separation based at least partially upon density with denser material (e.g. particles, liquids) being urged toward the inner periphery of the tank. Fluid passing through the filter assembly is additionally subjected to cross-flow filtration. The subject inlet feed shield prevents the membrane used in cross-flow filtration from being subject to excessive wear or fouling attributed to the feed pressures and feed content associated with cyclonic separations. The entire subject matter of each of the US patents mentioned herein references are fully incorporated by reference.

The invention claimed is:

1. A hydroclone (10) comprising a tank (12) including an inner peripheral wall (22) centered about a central axis (X), a fluid inlet (14), a filtered fluid outlet (16), an effluent outlet (18), a process fluid outlet (20), a vortex chamber (24) and an effluent separation chamber (30) separated by a vortex flow barrier (34) wherein the effluent outlet (18) and process fluid outlet (20) are located within the effluent separation chamber (30);

a filter assembly (26) located within the vortex chamber (24) and comprising an outer membrane surface (44) symmetrically located about the central axis (X) and enclosing a filtrate chamber (46) in fluid communication with the filtered fluid outlet (16);

a cleaning assembly (50) concentrically located and rotatably engaged about the membrane surface (44);

a fluid pathway (28) extending from the fluid inlet (14) and defining a vortex region (25) between the inner peripheral wall (22) of the vortex chamber (24) and the membrane surface (44) that is adapted for receiving incoming fluid;

an inlet flow shield (58) mounted upon the cleaning assembly (50) concentrically located about the filter assembly (26) and adapted to block at least a portion of fluid flowing into the vortex chamber (24) from the fluid inlet (14) from impacting the membrane surface (44); and wherein the vortex flow barrier (34) disrupts fluid flow from the vortex region (25) to the effluent separation chamber (30).

2. The hydroclone (10) of claim 1 wherein the inlet flow shield (58) comprises a non-porous cylindrical band.

3. The hydroclone (10) of claim 1 wherein the vortex flow barrier (34) directs a majority of fluid flow between the vortex and effluent separation (24, 30) chambers to locations adjacent to the inner peripheral wall (22) of the tank (12).

* * * * *